(12) United States Patent
Backer et al.

(10) Patent No.: US 8,775,122 B1
(45) Date of Patent: Jul. 8, 2014

(54) UTILIZATION REPORTING WITH MULTIPLE TIME FRAMES

(75) Inventors: Bryan L. Backer, Altadena, CA (US); Thomas Edwin Turicchi, Jr., Dallas, TX (US); Jerome A. Rolia, Kanata (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1126 days.

(21) Appl. No.: 11/680,620

(22) Filed: Feb. 28, 2007

(51) Int. Cl.
*G06F 19/00* (2011.01)

(52) U.S. Cl.
USPC ........................................... 702/179

(58) Field of Classification Search
USPC ............ 702/79, 81, 119, 123, 149, 176–179, 702/182, 183, 188, 193; 700/226; 709/226, 709/223, 224
See application file for complete search history.

(56) References Cited

U.S. PATENT DOCUMENTS

| | | | |
|---|---|---|---|
| 5,367,473 A | 11/1994 | Chu et al. | |
| 5,668,995 A | 9/1997 | Bhat | |
| 5,848,270 A | 12/1998 | DeLuca et al. | |
| 6,557,035 B1 | 4/2003 | McKnight | |
| 6,859,882 B2 | 2/2005 | Fung | |
| 7,028,301 B2 * | 4/2006 | Ding et al. | 718/104 |
| 7,032,119 B2 | 4/2006 | Fung | |
| 2003/0225768 A1 * | 12/2003 | Chaudhuri et al. | 707/10 |
| 2008/0034093 A1 * | 2/2008 | Sutou | 709/226 |

* cited by examiner

*Primary Examiner* — Mohamed Charioui

(57) ABSTRACT

A computer utilization report presents utilization data in tabular form so that utilization data for different time frames can be readily compared. The time frames include long and short continuous time frames, as well as at least one periodic discontinuous time frame.

10 Claims, 1 Drawing Sheet

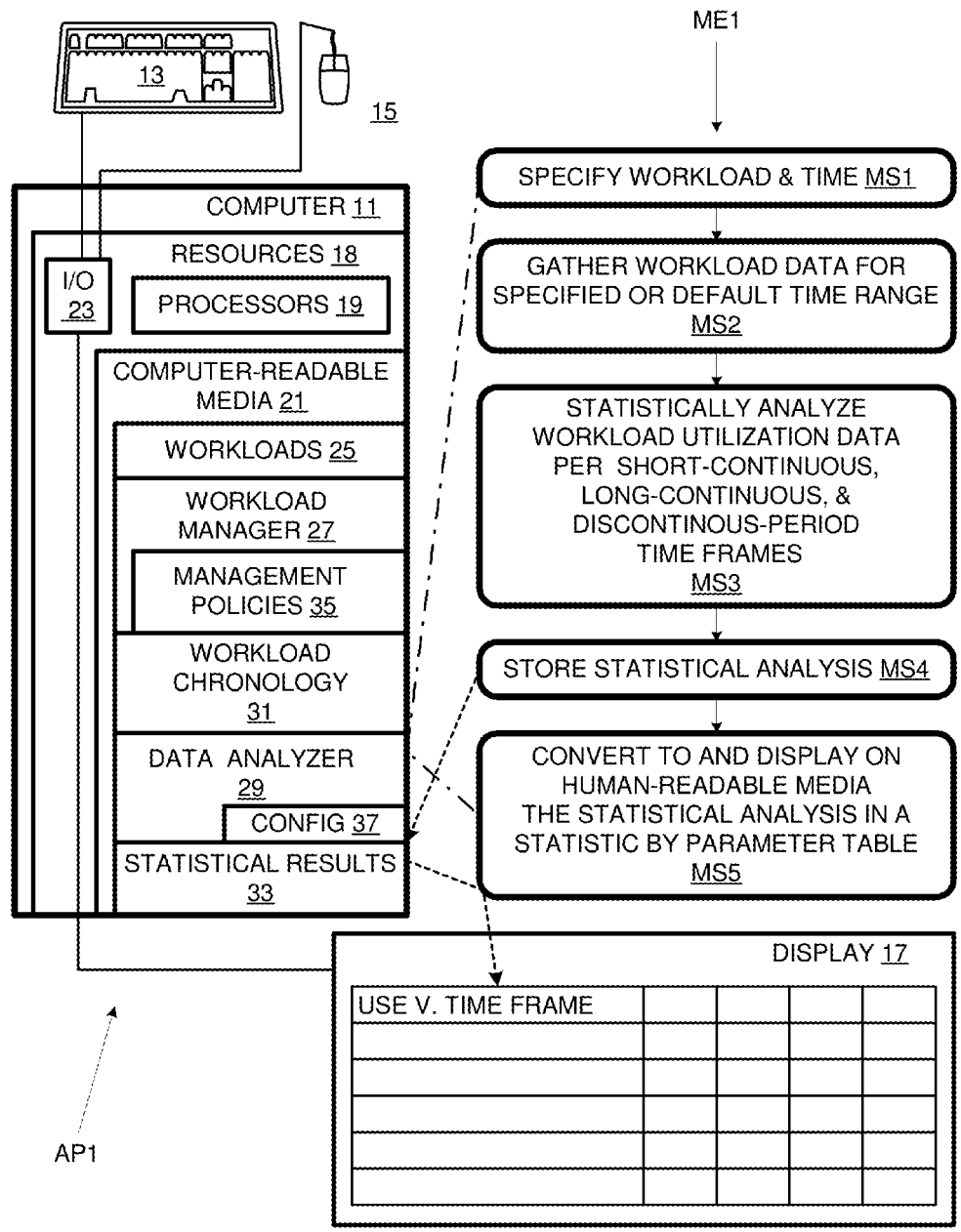

UTILIZATION REPORTING WITH MULTIPLE TIME FRAMES

BACKGROUND OF THE INVENTION

Historically, computer system administrators often knew load patterns for their particular workloads. For example, an administrator might know that an accounting workload tends to be busy at the months' end, while an e-commerce application might be busy daily between 3 pm and 10 pm. Unfortunately, as the number of workloads managed by a single person increases, it becomes infeasible for the person to know the resource utilization habits of a given workload over time. This means when that person receives notice (from a management tool or an end user) that a given workload is consuming a lot of resources, it is very time consuming for the administrator to check on a workload's history and determine if the current high utilization is 'normal' or represents a problem. Thus, it can be hard to determine whether to respond to high utilization by adding resources or by trying to fix a problem.

Herein, related art is described to aid in understanding the invention. Related art labeled "prior art" is admitted prior art. Related art not so labeled is not admitted prior art. The invention is described below with reference to the following drawing.

BRIEF DESCRIPTION OF THE DRAWING

The following are depictions of embodiments and implementations of the invention and not of the invention itself.

FIG. 1 is a combination block diagram and flow chart in accordance with embodiments of the invention.

DETAILED DESCRIPTION

Tools like the HP Global Workload Manager (available from Hewlett-Packard Company) help a single system administrator manage the resources of tens or hundreds of workloads. However, such workload managers do not distinguish between normally high and abnormally high resource utilization. There are graphical tools to visualize historical usage. While it is sometimes possible to see patterns in the resource waveforms, often spotting a trend over the correct timeframe is difficult. Moreover, it is not feasible to confirm a pattern over several periods (say weekly for 4 weeks) visually, then compute averages over same time periods with existing tools. The present invention provides a tool to help distinguish between normally high and abnormally high utilization—thus, providing a guide to whether intervention other than adding resources is called for.

In accordance with an embodiment of the invention, a computer system AP1 comprises a computer 11 and input/output devices including a keyboard 13, a mouse 15, and a display 17. Computer 11 includes hardware resources 18, including processors 19, computer-readable storage media 21, and input/output interfaces 23. Media 21, including computer memory, is used for storing programs of computer instructions, such as a workloads 25, workload manager 27, and a data analyzer 29, and data, including a workload chronology 31, statistical results 33, management policies 35, and configuration data 37, e.g., for data analyzer 29. Processor 19 manipulates this data in accordance with the computer instructions.

In the illustrated embodiment, each workload corresponds to an operating system instance along with any application programs running on that operating system instance. In other embodiments different resource compartment technologies may be employed: for example, a workload can be groups of processes tied to particular processors, a workload can be given special amounts of CPU access by a process run scheduler. A typical multitasking operating system allocates hardware resources among programs running on that operating system. However, operating systems do not typically allocate hardware resources among themselves. This function is performed in the illustrated embodiment by workload manager 27.

Workload manager 27 allocates hardware resources 18 among workloads 25 in accordance with management policies 35. Policies 35 can be as simple as specifying exactly which resources are to be assigned to a particular workload, but often require allocations to be calculated as a function of multiple factors, including load, use, and performance values for workloads that may compete for the same resources. In the illustrated embodiment, policies 35 define minimum, normal, and maximum numbers of processors to be assigned to a workload. The normal number the number of processors "owned" by a workload; in other words, the normal number is the number the workload will be allocated unless its demand is exceptionally high and other workloads can spare additional resources or unless other workloads need additional resources and the subject workload can spare some of its resources.

Workload manager 25 periodically, e.g., every five minutes, samples workload data to determine whether a reallocation is required, and then implements any required reallocation. Whether or not hardware resources are reallocated, the results of the determination are recorded in workload chronology 31, which is a database in which time is one of the key fields. For each sample period and for each workload, the following data is recorded in chronology 31: resource utilization, resource requirements (as requested by a workload 25), resource allocation (as implemented by workload manager 27), and pertinent policies then in force, e.g., minimum, owned, and maximum resource allocations.

Data analyzer 29 is designed to mine chronology 31 in response to queries specifying a workload, a target time, and a time range. If no time range is set, a default time range, e.g., three months, can be used.

Data analyzer 29 analyzes sample data for the specified workload for the specified or default time range. The analysis causes a report that includes: data for the most-recent sample prior to the specified time, statistics for certain time frames that include the previous hour, the previous 24 hours, and the entire specified or default time range. In addition, statistics are calculated for a discontinuous time frame, e.g., one that includes the specified time for a similar previous hour for the same day of week for different weeks. We refer to this as a "weekly time slot". Thus, the illustrated embodiment yields statistics for five time frames including one recent sample, three continuous durations, and a time slot. In other embodiments, different sets of time frames are used.

For each time frame, the following statistics are determined: the number of possible samples that could fit in the report time frame, the actual number of samples collected in the workload chronology for this workload, the policy minimum, owned, and maximum values, the average consumption, the average requirement, the average allocation, the average utilization (average consumption/average allocation, typically expressed as a percent). This data is presented on display 17 in tabular form, as indicated in FIG. 1.

A method ME1 of the invention is flow charted in FIG. 1. At method segment MS1, a workload and a target time are specified. The target time determines the time slot to study, i.e. the time target for the statistical analysis, while the report range determines what source data from the workload chronology is considered in the analysis. The invention provides for either specifying a time range or using a default time range. At method segment MS2, historical sample data from chronology 31 is examined for the specified or default time range.

At method segment MS3, the data is analyzed with respect to the following time frames: 1) for the entire continuous time range; 2) for the "most-recent" sample occurring at or immediately preceding the specified time, 3) for one-hour and 24-hour continuous periods ending at the target time, and 4) for weekly time slots up to and including the target time. The results are stored in computer-readable storage media 21 at method segment MS4.

At method segment MS5, the results are reported, e.g., presented on display 17 and/or printed in a human-readable format. The format includes a table showing statistics presented as a function of time frame, including continuous time frames and discontinuous time slot.

Table 4 provides data as a function of time slot.

TABLE 1

Abnormal Utilization Report for Workload "oak.OTHER"
Samples and Utilization by Period

| Metric | Prior Sample | Prior Hour | Prior 24-Hr | Weekly Time Slot | All Samples |
|---|---|---|---|---|---|
| Average Utilization | 54.15 | 45.84 | 30.45 | 20.69 | 24.43 |
| Average Requirements | 3.35 | 2.96 | 2.19 | 1.74 | 1.91 |
| Average Allocation | 4.05 | 4.01 | 4.00 | 4.00 | 4.00 |
| Actual Number of Samples | 1.00 | 12.00 | 288.00 | 60.00 | 9068.00 |
| Possible Number of Samples | 1.00 | 12.00 | 288.00 | 60.00 | 9217.71 |
| Average Sample Duation | 4.00 | 5.00 | 5.00 | 5.00 | 5.00 |
| Policy Mininum | 1.00 | 1.00 | 1.00 | 1.00 | 1.00 |
| Policy Owned | 4.00 | 4.00 | 4.00 | 4.00 | 4.00 |
| Policy Maximum | 8.00 | 8.00 | 8.00 | 8.00 | 8.00 |

Table 1 "Samples and Utilization by Period" is designed to help a human reader diagnose a problem that may have triggered the report. The table has six columns, "Metric", "Previous Sample", "Previous 24 Hours", "Weekly Timeslot", and "All Samples", as labeled in the title row for the table. The "Metric" column lists the statistical parameters evaluated. The row labels under "Metric" correspond to "Average Utilization", "Average Consumption", "Average Required", "Average Allocated", the number of actual samples, the number of possible samples, the minimum hardware resources (in this case, processors) specified by management policies 35. the normal or "owned" number of resources specified by policies 35, and the maximum amount of resources allocable to the target workload as specified by policies 35. Note that the actual number of samples can differ from the number of possible samples when the system is shut down during one or more times the samples were to have been taken. In other embodiments, other metrics, e.g., standard deviation, are included in the report.

The tabular data format can help a human analyst identify a problem. For example, if one or more values for the most recent previous sample or if one or more averages for the most recent hour differs significantly from statistics for the entire period, or the weekly time slot, or the most recent 24-hour period, then a problem can be attributed to a cause associated with the recent time and may be a problem other than repeated resource shortages such as excessive user demand or an application problem. On the other hand, if scanning the table indicates only small deviations, then the problem may be a recurring resource allocation shortfall and simply require a workload manager policy adjustment. Alternatively, the problem may lie with another workload that somehow affects the target workload.

The data in Table 1 shows that the most-recent hour and sample have higher average utilization and average requirements than the previous week, month, or time slot. That means this workload "is" experiencing higher than normal utilization, where "normal" is what we saw in the last week, month, or during the last month's Monday 9-10 AM time slot.

The title of the report is "Abnormal Utilization Report for oak.OTHER", where "oak.OTHER" is the identifier for the target workload. A number of items are presented under the header "Report Information", as shown in Table 2 below. These include: "Report Date" which is the date the report was generated; "Workload", which specifies the target workload; the "Report Date Range" which represents the specified or default date range of data from the workload chronology that is to be considered for this report optionally ending with the target date; "Possible Samples", in this case, the number of five-minute periods that could possibly fit in the date range; "Seen Data Range" starts from the oldest sample actually stored within the date range and ends with the last sample from the data range. "Target date" is the specified target date that sets the periods of study in the statistical analysis engine.

TABLE 2

Abnormal Utilization Report for Workload "oak.OTHER"
Report Information:

| ReportDate | 2007/02/20 11:52:33 |
| Workload | oak.OTHER |
| ReportDateRange | 2007/01/20 00:00:00- |
|  | 2007/02/20 23:59:59 |
| PossibleSamples | 9217.71 |
| SeenDataRange | 2007/01/20 00:01:30- |
|  | 2007/02/20 11:47:15 |
| TargetDate | 2007/02/19 09:00:00 |

The header "Workload Context Information" covers three subheaders: "Shared Resource Domain info", "Policy Info", and "Compartment Info", as shown below in Table 3. The "shared Resource Domain Info" heading covers a shared resource domain name, which in this case is "oak.srd". In this case, this is the name of the hardware entity on which the target workload is being run, but in general it is the pool of resources from which the workload manager will allocate resources to individual workloads. In addition, the "Domain info", specifies a "mode", which in this case is "managed". Allocations are automatic for "managed" nodes, for nodes in an alternative "advisory" mode, recommendations for allocations are made, but human intervention is required before implementation.

TABLE 3

Abnormal Utilization Report for Workload "oak.OTHER"
Workload Context Information
(from most recent sample):

Shared Resource Domain info:

| | |
|---|---|
| SRDName | oak.srd |
| SRDMode | Managed |

Policy info

| | |
|---|---|
| PolicyName | Owns_4-Max_8 |
| PolicyType | OwnBorrow |
| PolicySettings | min = 1.0/own = 4.0/max = 8.0 |

Compartment info:

| | |
|---|---|
| CompartmentName | Default |
| CompartmentType | Pset |
| CompartmentHost | oak.rsn.hp.com |

Table 3 above also presents the relevant policy data. The third item thereunder is "Policy Settings". In this case, policies 35 have assigned a minimum of 1 processor to oak.build, ownership of 4 processors, and a maximum of 8 processors. "PolicyName" is just a name, preferably a mnemonic one. "PolicyType" determines the parameters to be addressed under PolicySettings. In the illustrated case, the policy type is "OwnBorrow". Alternatives include "fixed", in which case, there would be only one value for PolicySettings (the fixed number of processors assigned to the workload), CPUUtil, which has a min and max setting but no Owned amount, and a custom external model (providing for more complex determinations for allocations based on external, application supplied metrics).

Compartment info in Table 3 refers to the technology underlying a workload—e.g., is it running on a virtual machine, a hard partition, a soft partition, a stand-alone workstation, or one of a group of compartments constructed to subdivide an OS instance with processor or run queue controls. In any case, the computer system that the workload is running on is listed under "Compartment Host".

The time periods used for the table are specified precisely under the heading "Period Date Range and Timeslot Info", as shown in Table 4 below. Table 4 characterizes the time slots.

TABLE 4

Abnormal Utilization Report for Workload "oak.OTHER"
Period Date Range and Timeslot Info:

Previous Sample

| | |
|---|---|
| SampleStartDate | 2007/02/19 08:57:15-2007/02/19 09:02:15 |
| Samples | 1.00 |

Previous Hour

| | |
|---|---|
| DesiredDateRange | 2007/02/18 09:00:00-2007/02/19 08:59:59 |
| ActualDateRange | 2007/02/19 08:02:15-2007/02/19 09:02:15 |
| Samples | 12.00 |

Previous 24 Hours

| | |
|---|---|
| DesiredDateRange | 2007/02/18 09:00:00-2007/02/19 08:59:59 |
| ActualDateRange | 2007/02/18 09:02:15-2007/02/19 09:02:15 |
| Samples | 288.00 |

Weekly Timeslot

| | |
|---|---|
| TimeSlot | Mon 9:00-9:59 |
| Samples | 60.00 |

All Samples

| | |
|---|---|
| DesiredDateRange | 2007/01/20 00:00:00-2007/02/20 23:59:59 |
| ActualDateRange | 2007/01/20 00:01:30-2007/02/20 11:47:15 |
| Samples | 9068.00 |

In addition, notes are automatically generated to help identify and explain anomalies, as indicated in Table 5.

TABLE 5

Abnormal Utilization Report for Workload "oak.OTHER"
Notes

| | |
|---|---|
| Note 1: Workload's policy changed | This problem first occurred on 2007/02/13 14:55:30 CST and occurred 2 total times. |
| Note 2: Workload's sample size changed by at least 10% | This problem first occurred on 2007/01/24 08:05:30 CST and occurred 4 total times |
| Note 3: Workload's sample start time older than previous sample end time | This problem occurred once on 2007/01/24 08:05:45 CST. |
| Note 4: Workload missing 12.21 hours of data at end of report period. | This problem occurred once on 2007/02/20 11:47:15 CST. |

The invention provides for a variety of formats for presenting the foregoing data so that utilization can readily be compared across time frames. These and other variations upon and modifications are provided for by the present invention, the scope of which is defined in the following claims.

What is claimed is:

1. A method comprising:
   a computer gathering utilization data regarding a workload for a specified or default time range;
   said computer statistically analyzing said utilization data for said workload to yield a utilization report representing utilization for multiple time frames, said report specifying
      a first utilization value representing average utilization for a first continuous time frame,
      a second utilization value representing average utilization for a second continuous time frame, said second continuous time frame being longer than and including said first continuous time frame, and
      a third utilization value representing average utilization over a periodic discontinuous time frame, and
   said computer displaying a table including said first, second, and third values in human readable form.

2. A method as recited in claim 1 wherein said discontinuous time frame includes said first continuous time frame and other time frames of duration equal to that of said first continuous time frame.

3. A method as recited in claim 1 wherein said continuous time frames include a one-hour long time frame and a 24-hour long time frame, said periodic discontinuous time frame defining a one-hour weekly time slot.

4. A method as recited in claim 1 wherein said data include utilization as a percentage of allocation of a resource.

5. A method as recited in claim 1 wherein said data compares utilization with resource requirements.

6. Non-transitory tangible computer-readable storage media comprising a program configured to, when executed by a computer, to provide for
   specifying a computer workload;
   gathering data regarding said workload for a specified or default time range;
   statistically analyzing utilization data for said workload to yield a statistical analysis representing utilization for multiple time frames including
      a first utilization value representing average utilization for a first continuous time frame,
      a second utilization value representing average utilization for a second continuous time frame, said second continuous time frame being longer than and including said first continuous time frame, and a third utilization value representing average utilization over a periodic discontinuous time frame, and displaying a table including said first, second, and third values in human readable form.

7. Non-transitory tangible computer-readable storage media as recited in claim 6 wherein said discontinuous time frame includes said first continuous time frame and other time frames of duration equal to that of said first continuous time frame.

8. Non-transitory tangible computer-readable storage media as recited in claim 6 wherein said continuous time frames include a one-hour long time frame and a 24-hour long time frame, said periodic discontinuous time frame defining a one-hour weekly time slot.

9. Non-transitory tangible computer-readable storage media as recited in claim 6 wherein said data include utilization as a percentage of allocation of a resource.

10. Non-transitory tangible computer-readable storage media as recited in claim 6 wherein said data compares utilization with resource requirements.

\* \* \* \* \*